(12) United States Patent
Brown

(10) Patent No.: US 10,807,453 B2
(45) Date of Patent: Oct. 20, 2020

(54) HAND-HELD MAGNETIC CLAMPING DEVICE FOR CAR COVERS

(71) Applicant: Ronald W. Brown, Cincinnati, OH (US)

(72) Inventor: Ronald W. Brown, Cincinnati, OH (US)

(*) Notice: Subject to any disclaimer, the term of this patent is extended or adjusted under 35 U.S.C. 154(b) by 124 days.

(21) Appl. No.: 16/312,500

(22) PCT Filed: Aug. 31, 2017

(86) PCT No.: PCT/IB2017/055253
§ 371 (c)(1),
(2) Date: Dec. 21, 2018

(87) PCT Pub. No.: WO2018/042374
PCT Pub. Date: Mar. 8, 2018

(65) Prior Publication Data
US 2019/0160930 A1 May 30, 2019

Related U.S. Application Data

(60) Provisional application No. 62/381,738, filed on Aug. 31, 2016.

(51) Int. Cl.
B60J 11/00 (2006.01)
B60J 11/06 (2006.01)
B60R 13/04 (2006.01)

(52) U.S. Cl.
CPC ............ B60J 11/06 (2013.01); B60J 11/00 (2013.01); B60R 13/04 (2013.01)

(58) Field of Classification Search
CPC . B60J 11/06; B60J 11/00; B60R 13/04; Y10S 211/01
See application file for complete search history.

(56) References Cited

U.S. PATENT DOCUMENTS 2,176,052 A * 10/1939 Beyer ................ A44C 5/0046
132/331
2,405,655 A * 8/1946 Kehoe .................... B03C 1/28
294/65.5

(Continued)

FOREIGN PATENT DOCUMENTS

DE 3814044 A1 10/1988
DE 202012010911 U1 3/2013
KR 20140027737 A 3/2014

Primary Examiner — Bradley Duckworth
(74) Attorney, Agent, or Firm — David Guerra

(57) ABSTRACT

A hand-held magnetic clamping device for clamping a car cover onto the exterior surface of a car's body includes an encasing structure, a plurality of magnets, a scaffolding, and a reversible handle. The encasing structure clamps the car cover onto the exterior surface of a car's body. The plurality of magnets magnetically affixes the encasing structure to the body's surface, thereby preventing the car cover from sliding off of the exterior body's surface. The scaffolding offsets the plurality of magnets from the center of the encasing structure. As a result, the first contact side of the encasing structure is used to clamp a thickly padded car cover while the second contact side of the encasing structure is used to clamp a thinly padded car cover. The reversible handle allows the user to physically disengage the magnetic connection between the encasing structure and the exterior surface.

15 Claims, 8 Drawing Sheets

(56) References Cited

U.S. PATENT DOCUMENTS

| | | | | |
|---|---|---|---|---|
| 4,014,583 | A * | 3/1977 | Forbes | B60R 13/04 |
| | | | | 293/128 |
| 4,586,616 | A * | 5/1986 | Cooper | A47J 47/16 |
| | | | | 211/88.04 |
| 4,826,059 | A * | 5/1989 | Bosch | A45C 11/24 |
| | | | | 206/350 |
| 5,129,695 | A * | 7/1992 | Norman, II | B60J 11/06 |
| | | | | 280/770 |
| 5,320,392 | A * | 6/1994 | Hart | B60R 13/04 |
| | | | | 280/770 |
| 5,760,668 | A * | 6/1998 | Testa | B23Q 3/1546 |
| | | | | 335/285 |
| 6,587,022 | B1 * | 7/2003 | Devine | A45F 5/00 |
| | | | | 206/350 |
| 9,202,615 | B2 * | 12/2015 | Fullerton | H01F 7/0257 |
| 9,349,514 | B2 * | 5/2016 | Taylor | E05B 77/34 |
| 10,221,005 | B2 * | 3/2019 | James, Jr. | A45C 13/02 |
| 10,304,429 | B1 * | 5/2019 | Broadbelt | G10G 5/00 |
| 10,493,832 | B1 * | 12/2019 | White | B60J 11/06 |
| 2005/0167547 | A1 * | 8/2005 | McLellan | F16B 2/005 |
| | | | | 248/74.4 |
| 2010/0025442 | A1 * | 2/2010 | Shurm | A45F 5/00 |
| | | | | 224/183 |
| 2019/0177983 | A1 * | 6/2019 | Klein | E04F 13/0883 |
| 2019/0389294 | A1 * | 12/2019 | Brown | B60J 11/00 |

\* cited by examiner

FIG. 7

HAND-HELD MAGNETIC CLAMPING DEVICE FOR CAR COVERS

The current application claims a priority to the U.S. Provisional Patent application Ser. No. 62/381,738 filed on Aug. 31, 2016.

FIELD OF THE INVENTION

The present invention generally relates to a hand-held magnetic clamping device for clamping a car cover onto the exterior surface of a car. More specifically, a magnetic clamping device having a plurality of magnets secured within an encasing structure generates a strong magnetic pull at a first contact side and a weak magnetic pull at a second contact side.

BACKGROUND OF THE INVENTION

A hand held magnetic device aids in securing a car cover onto an automobile's steel exterior surface. Whereas, without said device, an individual would not be able to easily affix, position, and secure the cover due to the size of most car covers. This device is rectangular in shape with a soft resin exterior skin which has corners and rounded edges designed to prevent damage to the exterior of any automobile's thin painted surface. The device contains a plurality of magnets dispersed throughout the interior of its encasement. The dispersed magnets are held individually and securely within an internal scaffolding. Clamping a thin material car cover does not require as much magnetic pull as clamping a thicker material car cover material onto an automobile. As such, the scaffolding is configured to reduce the magnetic attraction on one side and leave the magnetic attraction on an opposite side unaffected.

One side of the internal scaffolding is more open, thereby exposing the plurality of magnets held therein. The opposite side of the internal scaffolding is covered by an internal scaffolding skin which is positioned between the plurality of magnets and the internal contact side of the encasing structure. The internal skin increases the distance between the external surface of the encasing skin and the plurality of magnets on that side thereby reducing the magnetic pull. Because of this design, the magnetic pull at one side is stronger than the magnetic pull at the opposite side. A reversible handle is secured to the encasing structure via an attachment bar which allows either side to have a handle during use.

BRIEF DESCRIPTION OF THE DRAWINGS

FIG. 7 is a perspective view of the scaffolding with the second planar side being positioned face-up.

DETAILED DESCRIPTION OF THE INVENTION

Figure 1:
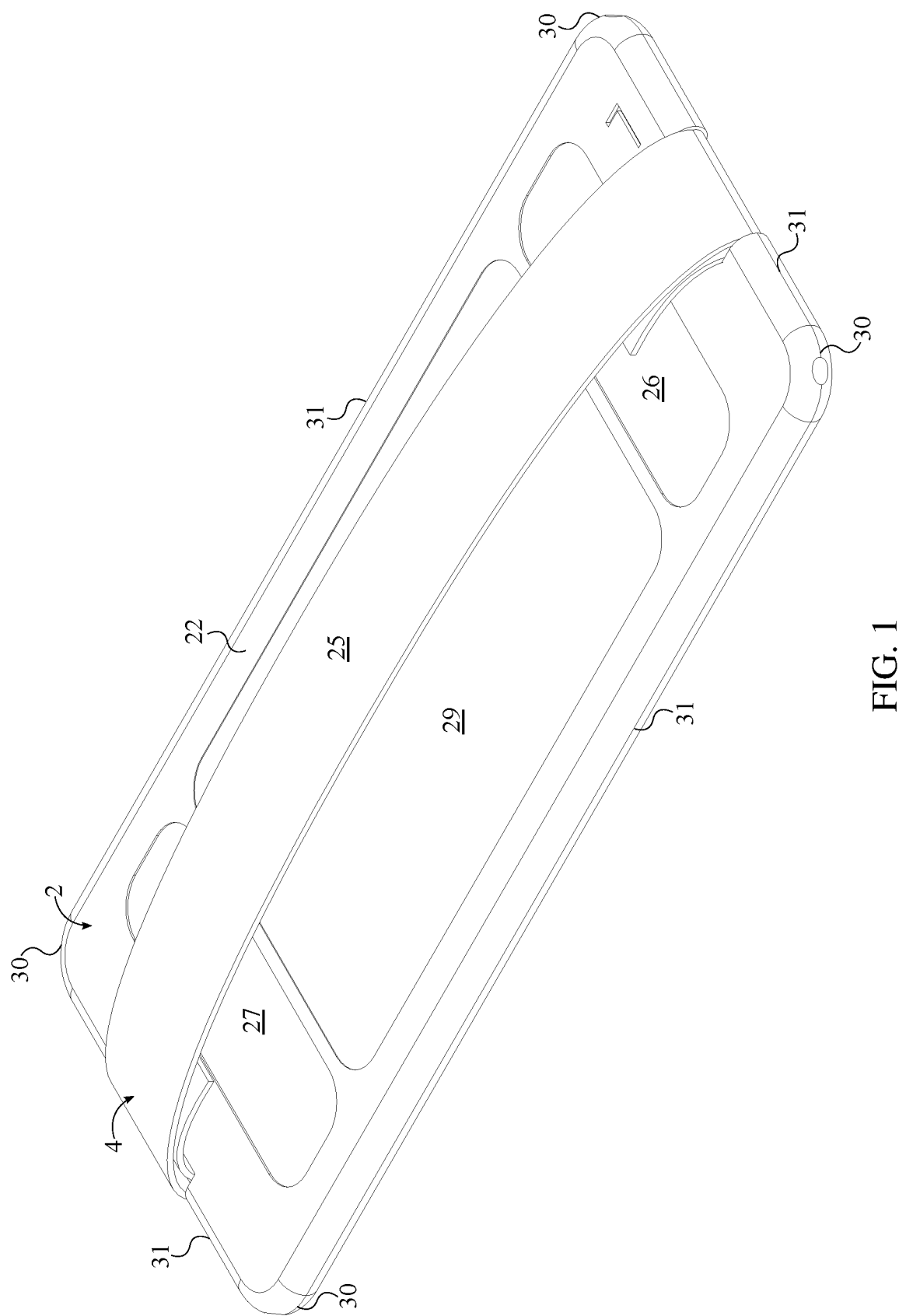
FIG. 1 is a perspective view of the present invention with the second contact side being positioned face-up.

All illustrations of the drawings are for the purpose of describing selected versions of the present invention and are not intended to limit the scope of the present invention.

The present invention is a magnetic clamping device for car covers capable of magnetically securing a car cover onto the metallic exterior surface of a car's body. The preferred embodiment of the present invention comprises a plurality of magnets 1, an encasing structure 2, a reversible handle 4, and a scaffolding 5. Conventional automobiles utilize an exterior body made of metallic materials that are magnetically conductive. This allows the plurality of magnets 1 to magnetically fasten the encasing structure 2 to the exterior body surface of an automobile with a car cover in-between. In reference to FIG. 1, the plurality of magnets 1 generates a magnetic field that interacts with the metallic materials in the exterior body. The reversible handle 4 can be used to physically pull the encasing structure 2 apart from the car cover and the exterior body surface. The encasing structure 2 comprises a first contact side 21 and a second contact side 22. The magnetic attraction between the plurality of magnets 1 and the exterior body surface causes either the first contact side 21 or the second contact side 22 to press against the car cover. This allows the encasing structure 2 to clamp the car cover onto the exterior body surface.

Figure 2:
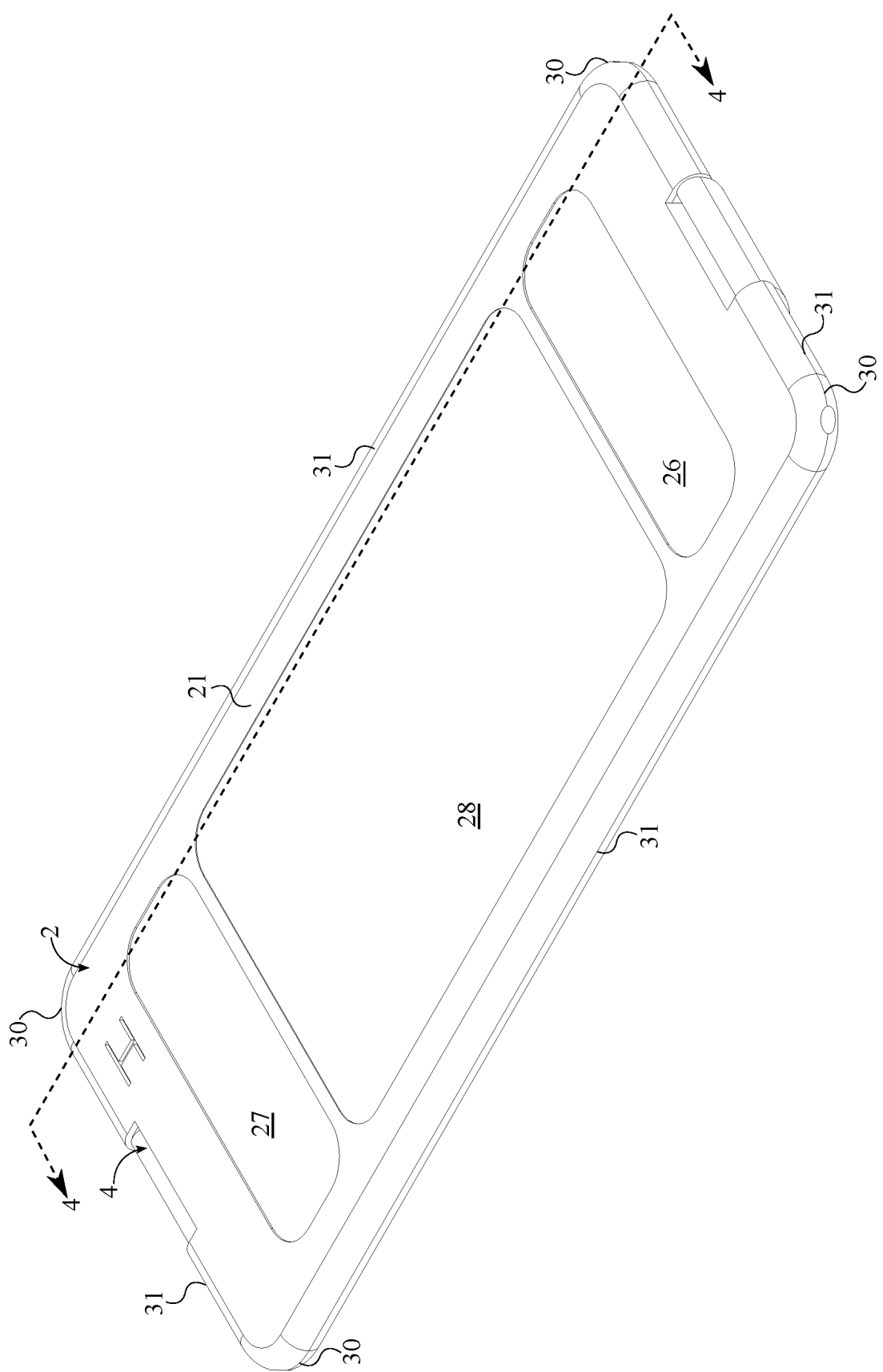
FIG. 2 is a perspective view of the present invention with the first contact side being positioned face-up.

Referring to FIG. 1 and FIG. 2, the first contact side 21 and the second contact side 22 are positioned opposite to each other about the encasing structure 2. The plurality of magnets 1 is mounted within the encasing structure 2 by the scaffolding 5. In particular, the scaffolding 5 securely positions the plurality of magnets 1 throughout the encasing structure 2. As a result, the plurality of magnets 1 is distributed throughout the encasing structure 2. The magnetic force generated by the plurality of magnets 1 is distributed equally about the encasing structure 2. This prevents the creation of pressure points which can damage the underlying exterior body surface. The plurality of magnets 1 is operatively integrated into the encasing structure 2, wherein the plurality of magnets 1 generates a stronger magnetic pull across the first contact side 21 and a weaker magnetic pull across the second contact side 22. In the preferred implementation of the present invention, the second contact side 22 with the weaker magnetic pull may be used to clamp a car cover with shallow thickness, while the first contact side 21 may be used to clamp a thicker car cover. The reversible handle 4 is detachably attached to the encasing structure 2. In particular, the first end of the reversible handle 4 is attached adjacently to the first end of the encasing structure 2 and the second end of the reversible handle 4 is detachably attached to the second end of the encasing structure 2. The user can grip the reversible handle 4 by holding on to the concave side of the reversible handle 4.

Figure 3:
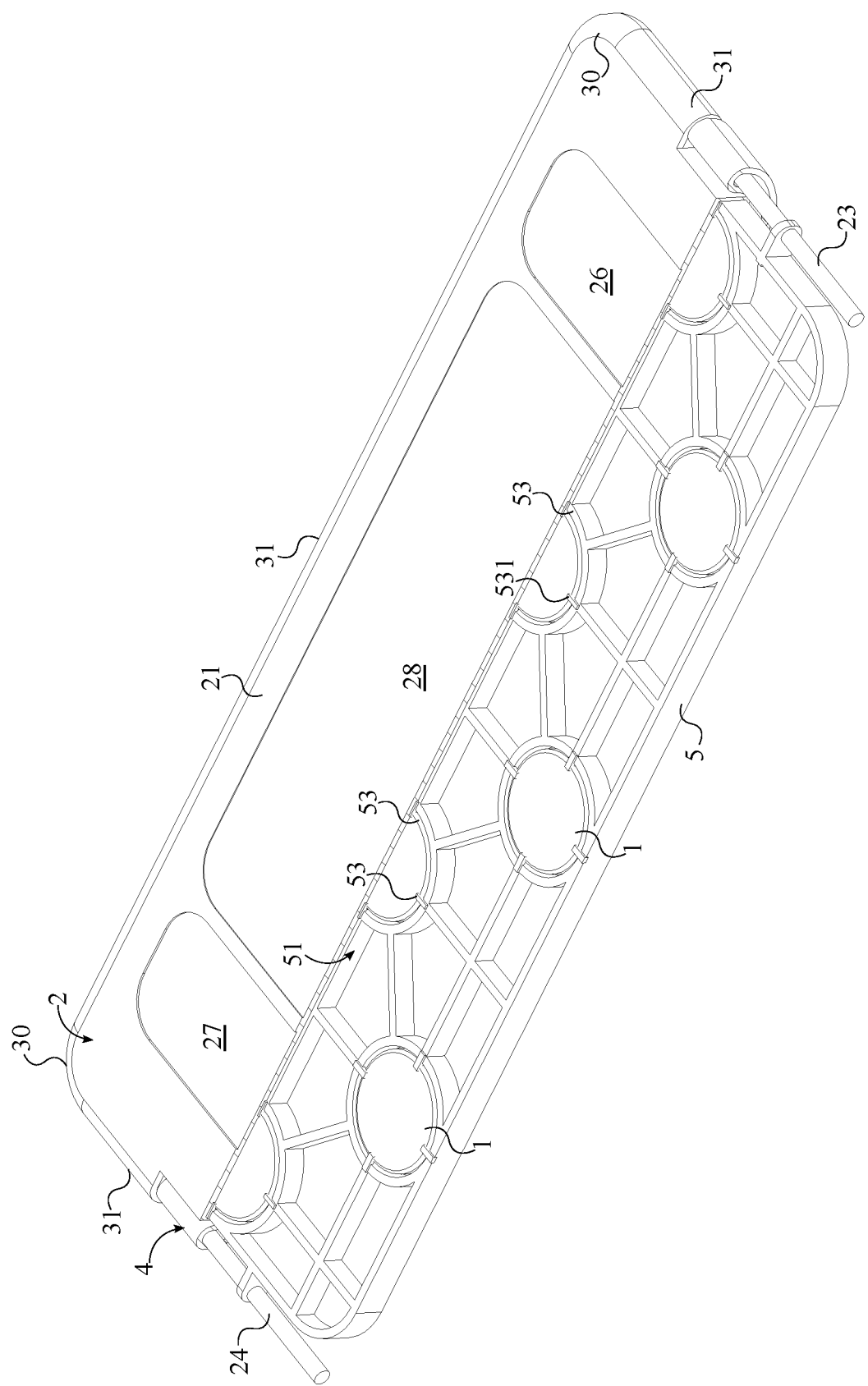
FIG. 3 is a perspective view of the present invention with the first contact side being positioned face-up, wherein a portion of the encasing structure is removed to reveal the scaffolding on the inside.

As is apparent in FIG. 3, the plurality of magnets 1 is placed within a scaffolding 5 that prevents ghost silhouetting on the outer surface of the encasing structure 2. Accordingly, the scaffolding 5 comprises a first planar side 51, a second planar side 52, and a plurality of slots 53, wherein the first planar side 51 and the second planar side 52 are two distinctly different sides. In the preferred implementation of the present invention, the plurality of magnets 1 lies on top of the second planar side 52. The second planar side 52 is configured to reduce the magnetic pull of the plurality of magnets 1 at the second contact side 22, in relation to the magnetic pull at the first contact side 21. As such, the magnetic pull at the first planar side 51 and, thus, the first contact side 21 is greater than the magnetic pull at the second contact side 22. The first planar side 51 presents an opening whereby the plurality of magnets 1 are inserted into the scaffolding 5. Each of the plurality of slots 53 is connected to each other via connective pieces. The connective pieces fix the vertical and horizontal distance between each of the plurality of slots 53. Each of the plurality of magnets 1 is mounted into a corresponding slot from the plurality of slots 53. As such, the plurality of slots 53 is used to physically separate each of the plurality of magnets 1 from each other. In addition to securing the plurality of magnets 1 in the desired position, the scaffolding 5 also adds rigidity and structural integrity to the encasing structure 2. Accordingly, the scaffolding 5 is mounted within the encasing structure 2.

Figure 4:
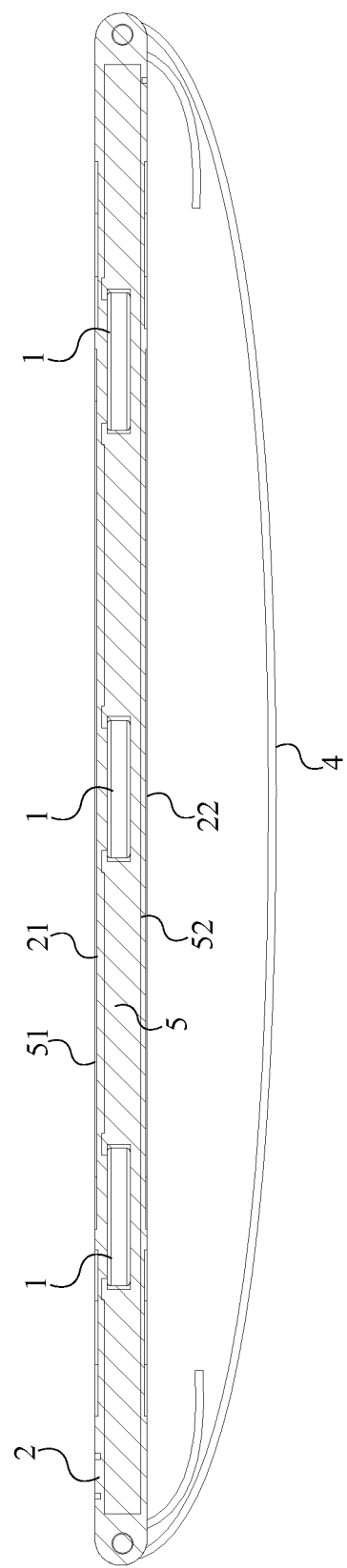
FIG. 4 is a perspective view of the present invention taken along line 4-4 in FIG. 2, wherein the position of the magnets is shown in relation to the first contact side and the second contact side.
Figure 7:
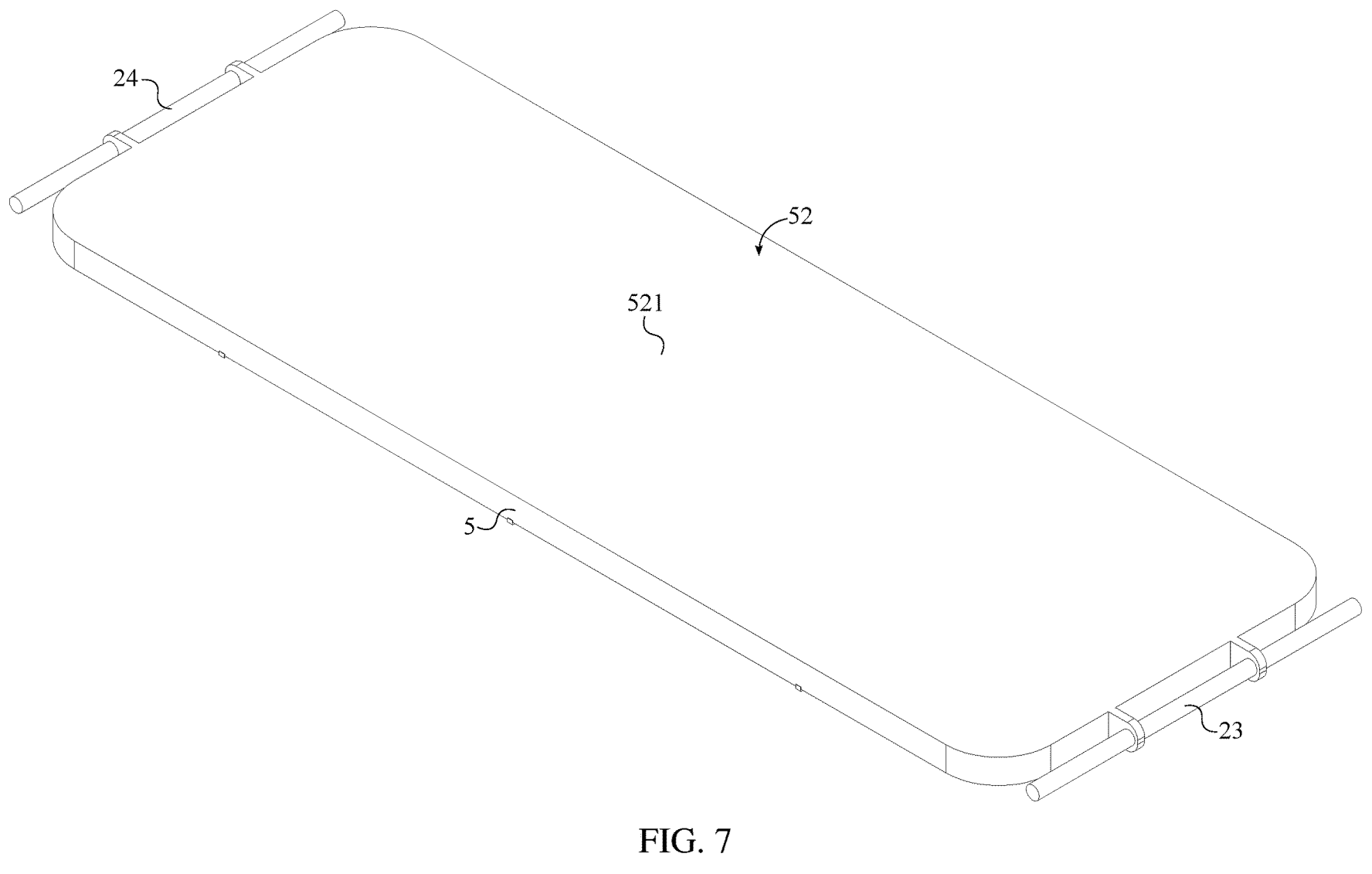

Referring now to FIG. 7, in the preferred embodiment of the present invention, the second planar side 52 is an integrated floor panel 521. Referring to FIG. 4, the integrated floor panel 521 is positioned between the scaffolding 5 and the interior of the second contact side 22. The integrated floor panel 521 is made of high-density polymers which allows the scaffolding 5 to flex while retaining the original shape. The integrated floor panel 521 increases the effective distance between the plurality of magnets 1 and the second contact side 22 of the encasing structure 2, thereby moving the plurality of magnets 1 closer to the first contact side 21. As a result, the plurality of magnets 1 is positioned closer to the first contact side 21 than the second contact side 22, which causes the magnetic attraction at the first contact side 21 to be stronger than the magnetic attraction at the second contact side 22. Accordingly, the attraction force exerted by the first contact side 21 on the exterior body surface is significantly higher than attraction force exerted by the second contact side 22. As such, a thickly padded car cover may be used to cushion the exterior body surface against the first contact side 21. Accordingly, in the preferred implementation of the present invention, the first contact side 21 with the relatively strong magnetic pull is used to securely clamp a very thickly padded car cover. The second contact side 22 having a relatively weak magnetic pull is used to clamp a thinly padded car cover.

Figure 5:
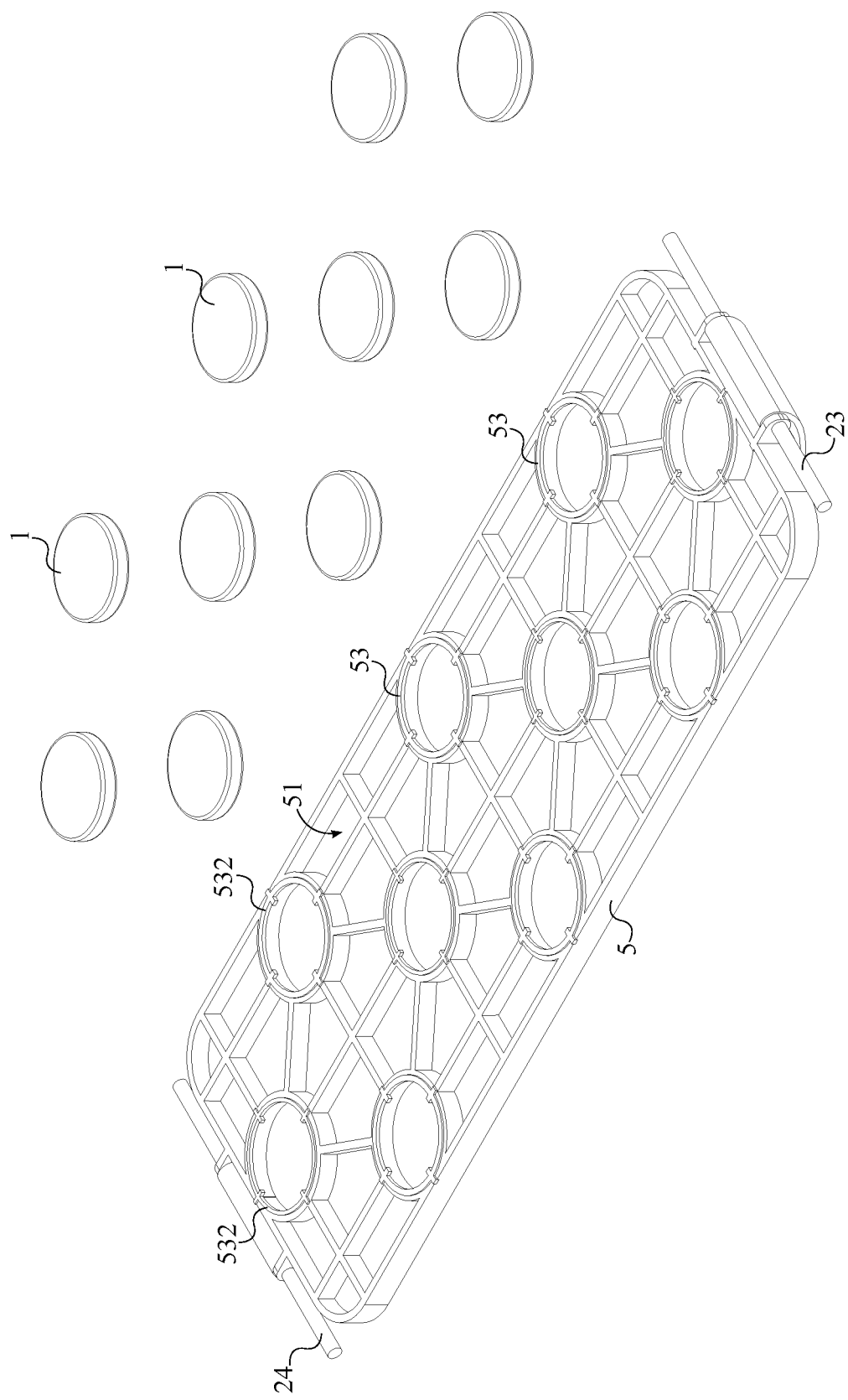
FIG. 5 is an exploded view of the plurality of magnets and the scaffolding, wherein the scaffolding includes the snap-locking upper lip.

In reference to FIG. 5, each of the plurality of slots 53 comprises a snap-locking upper lip 532. The snap-locking upper lip 532 mechanically fastens each of the plurality of magnets 1 inside a corresponding slot and thus is positioned within an opening of the corresponding slot. More specifically, the snap-locking upper lip 532 protrudes inwards from the opening on each of the plurality of slots 53. Each of the plurality of magnets 1 is pressed and held within the corresponding slot by the snap-locking upper lip 532, wherein the plurality of magnets 1 is prevented from being pushed out by the integrated floor panel 521. In order to insert one of the plurality of magnets 1 into one of the plurality of slots 53, the opening is enlarged by bending the snap-locking upper lip 532. Once inserted, the snap-locking upper lip 532 bends back into the straight position reducing the size of the opening and locking one of the plurality of magnets 1 therein.

Figure 6:
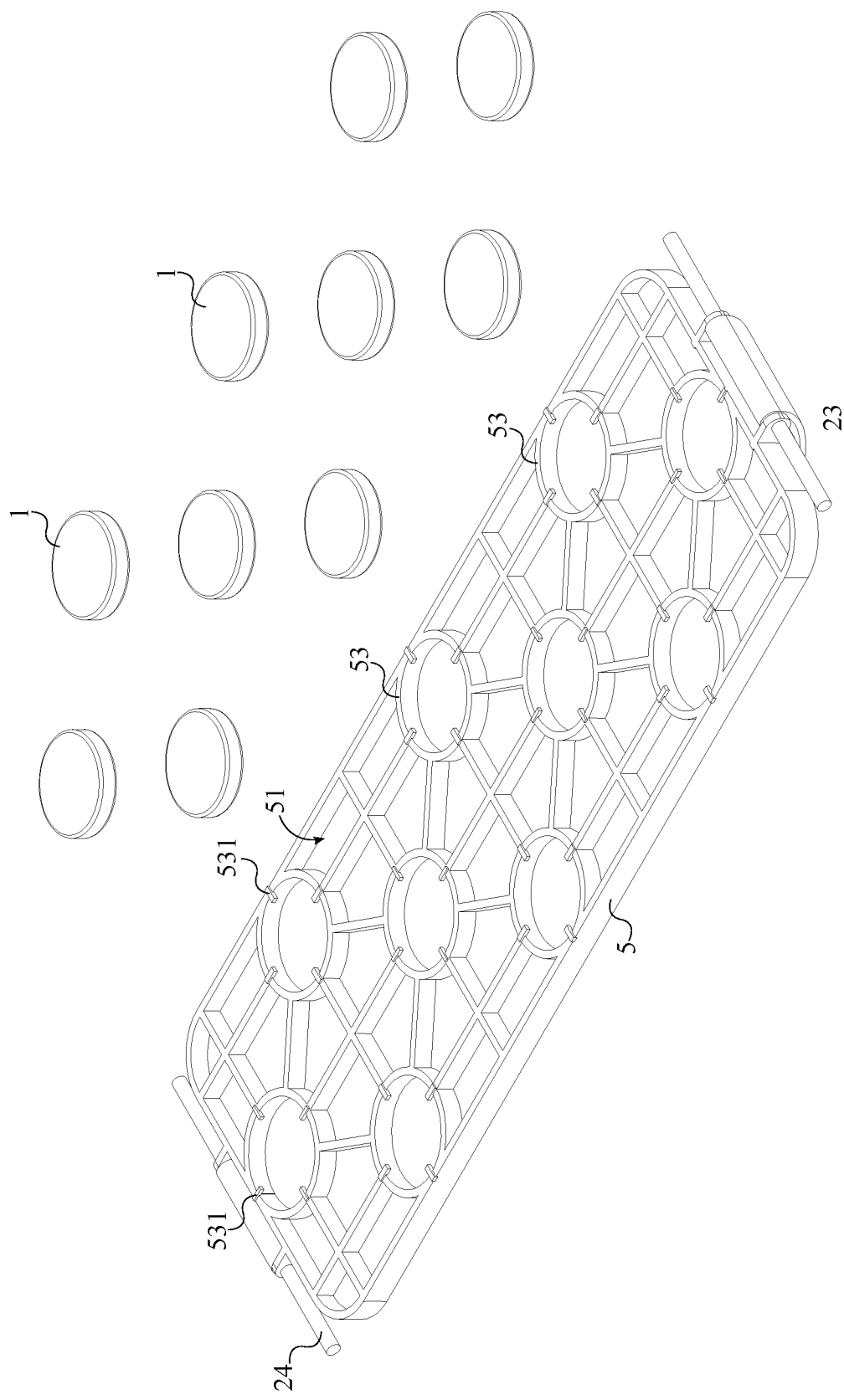
FIG. 6 is an exploded view of the plurality of magnets and the scaffolding, wherein the scaffolding includes the snap-locking upper tabs.

In an alternate embodiment of the present invention, each of the plurality of slots 53 comprises a plurality of snap-locking upper tabs 531. As can be seen in FIG. 6, the plurality of snap-locking upper tabs 531 is distributed about an opening of the corresponding slot. More specifically, each snap-locking upper tab 531 is radially equidistant from one another. Each of the plurality of magnets 1 is pressed and held within the corresponding slot by the plurality of snap-locking upper tabs 531, wherein the plurality of magnets 1 is prevented from being pushed out by the integrated floor panel 521. The plurality of snap-locking upper tabs 531 is deformable in one direction. This allows for the insertion of the plurality of magnets 1 into the plurality of slots 53, while preventing each the plurality of magnets 1 from pulling out from the corresponding slot due to the magnetic force.

The preferred embodiment of the reversible handle 4 is detachably attached to the encasing structure 2. As is apparent in FIG. 1 and FIG. 8, this allows the user to switch the position of the reversible handle 4 in relation to the encasing structure 2. As such, the reversible handle 4 is positioned across the first contact side 21. This configuration allows the user access to the reversible handle 4 when the second contact side 22 is used to clamp the car cover. Alternately, the reversible handle 4 is positioned across the second contact side 22. This configuration allows the user access to the reversible handle 4 when the first contact side 21 is used to clamp the car cover.

Referring once more to FIG. 5 and FIG. 6, the encasing structure 2 comprises a first handle-attachment bar 23 and a second handle-attachment bar 24. The first handle-attachment bar 23 and the second handle-attachment bar 24 selectively couples the reversible handle 4 to the encasing structure 2. A couple of holes positioned on the opposite ends of the encasing structure allows the first handle-attachment bar 23 and the second handle-attachment bar 24 to be mounted inside the encasing structure 2. The couple of holes are positioned concentric to the handle receiving holes positioned on the opposite ends of the scaffolding 5. As such, the couple of holes allow the first handle-attachment bar 23 and the second handle-attachment bar 24 can connect to the handle receiving holes of the scaffolding. This also enables the user to replace the first handle-attachment bar 23 and the second handle-attachment bar 24 as needed. Both the first handle-attachment bar 23 and the second handle-attachment bar 24 utilize a metallic bar pivotally coupled to the terminal portions of the reversible handle 4. Alternately, the first handle-attachment bar 23 and the second handle-attachment bar 24 may be coupled via any other suitable mechanism. The first handle-attachment bar 23 is terminally mounted to the encasing structure 2. In particular, the first handle-attachment bar 23 is mounted onto a first slot cut into the distal portion of the encasing structure 2. Further, the second handle-attachment bar 24 is terminally mounted to the encasing structure 2, opposite to the first handle-attachment bar 23. In particular, the second handle-attachment bar 24 is mounted to a second slot cut into the distal portion of the encasing structure 2, opposite the first slot. The first handle-attachment bar 23 and the second handle-attachment bar 24 are positioned in between the first contact side 21 and the second contact side 22. As such, the reversible handle 4 is attached in the middle portion of the encasing structure 2. When the user pulls the reversible handle 4, this configuration causes tension exerted on the reversible handle 4 to be distributed equally between the first handle-attachment bar 23 and the second handle-attachment bar 24.

Referring once more to FIG. 1 and FIG. 2, the preferred embodiment of the reversible handle 4 comprises a single continuous strap 25. More specifically, hooks-and-loops fasteners mounted on the lateral surfaces of the single continuous strap 25 allows the reversible handle 4 to releasably couple to the encasing structure 2. This allows the user to change the position of the reversible handle 4 in relation to the encasing structure 2. As a result, the concave side of the reversible handle 4 can be positioned adjacent to either the first contact side 21 or the second contact side 22. Thus, when the first contact side 21 is utilized on a car cover, the concave side of the reversible handle 4 is positioned adjacent the second contact side 22, in easy reach of the user. When the second contact side 22 is utilized on a car cover, the concave side of the reversible handle 4 is positioned adjacent the first contact side 21, allowing the user to grip thereon. The first handle-attachment bar 23 is terminally coupled to the single continuous strap 25. The second handle-attachment bar 24 is terminally coupled to the single continuous strap 25, opposite to the first handle-attachment bar 23. The terminal portions of the single continuous strap 25 are looped around the first handle-attachment bar 23 and the second handle-attachment bar 24. The hooks-and-loops fastener is used to securely close the loops on their respective terminal portions. In order to release the reversible handle 4, the hooks-and-loops fastener is disconnected and the terminal portions are untied from the first handle-attachment bar 23 and the second handle-attachment bar 24.

In another embodiment of the present invention, the reversible handle 4 comprises a first strap and a second strap. In the preferred implementation of the present invention, the user can grip the first strap and the second strap to physically pull the encasing structure 2 off of the exterior body surface. As such, the first handle-attachment bar 23 is terminally coupled to the first strap. Further, the second handle-attachment bar 24 is terminally coupled to the second strap. In the preferred implementation, the terminal portions of the first strap and the second strap are respectively looped around the first handle-attachment bar 23 and the second handle-attachment bar 24. Once tied, the terminal portions are secured using a selectively fastening mechanism. Alternately, the terminal portions may be secured via snaps, zippers, magnetic fasteners, and the similar mechanisms. Unlike the single continuous strap 25, the first strap and the second strap are accessible to the user regardless of the which of the first contact side 21 or second contact side 22 is utilized. Thus, the user does not need to change the position of the reversible handle 4 to switch from utilizing the first contact side 21 to the second contact side 22.

In reference to FIG. 6 and FIG. 7, the encasing structure 2 comprises a first cover-fastening mechanism 26 and a second cover-fastening mechanism 27. The first cover-fastening mechanism 26 and the second cover-fastening mechanism 27 allows the encasing structure 2 to be mounted onto a car cover. As such, the first cover-fastening mechanism 26 and the second cover-fastening mechanism 27 are integrated into the first contact side 21. Additionally, the first cover-fastening mechanism 26 and the second cover-fastening mechanism 27 are positioned opposite to each other across the first contact side 21. In the preferred implementation of the present invention, the first cover-fastening mechanism 26 and the second cover-fastening mechanism 27 are fashioned with the hook portions of a hooks-and-loops fastener. The hook portions selectively fasten to the loop portions integrated into the outer surface of the car cover, thereby allowing the encasing structure 2 to be temporarily mounted onto the outer surface of the car cover. This allows the present invention to be stored with the car cover when not in use.

Figure 8:
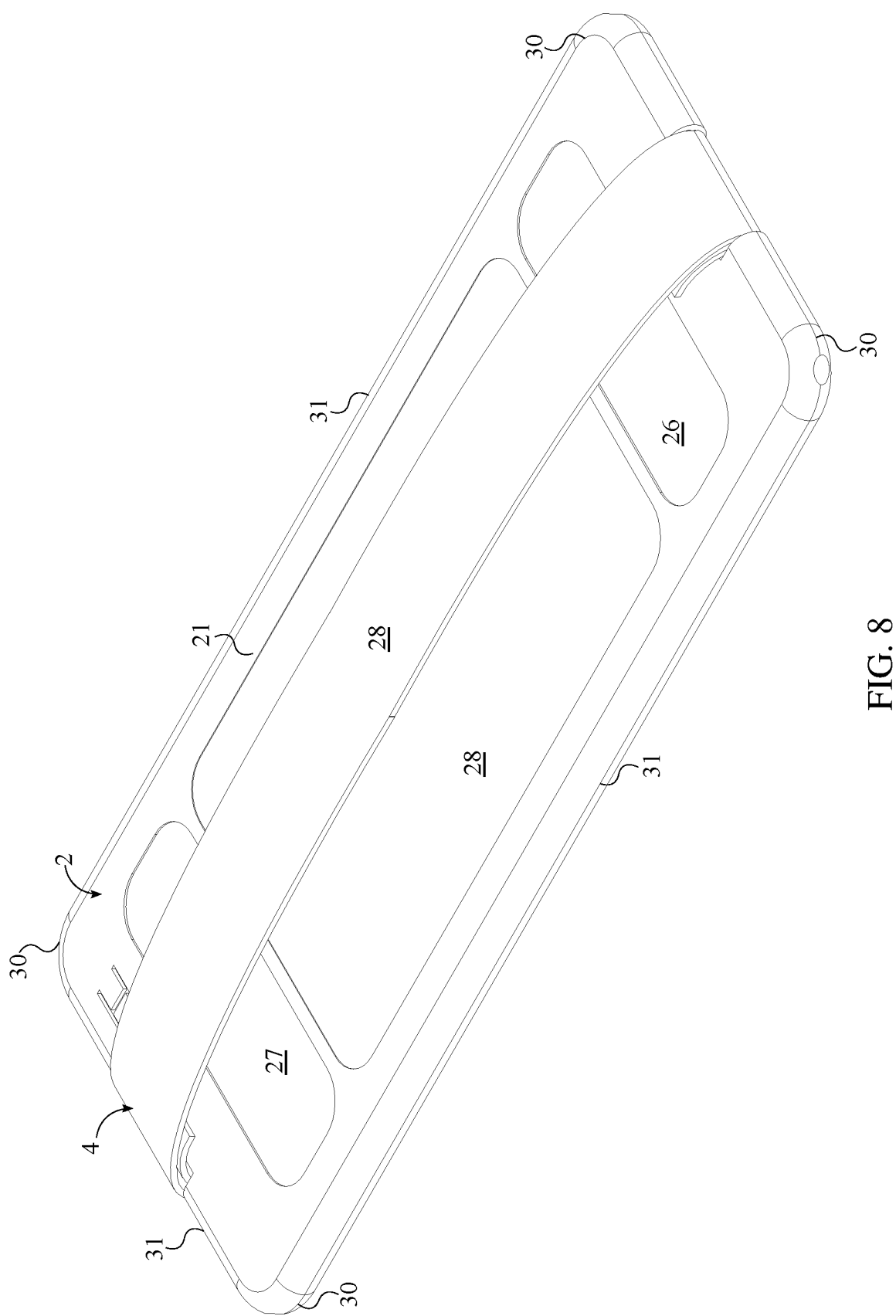
FIG. 8 is a perspective view of the present invention with the reversible handle being positioned across the first contact side.

In reference to FIG. 8, a first graphic-mounting recess 28 allows some decorative indicia to be displayed on top of the first contact side 21. The first graphic-mounting recess 28 traverses into the encasing structure 2 from the first contact side 21. Additionally, the first graphic-mounting recess 28 is centrally positioned in between the first cover-fastening mechanism 26 and the second cover-fastening mechanism 27. A sticker having some decorative indicia applied thereon is perimetrically mounted within the second graphic-mounting recess 29. In the preferred embodiment of the present invention, the recess perimetrically secures a sticker with the decorative indicia applied thereon. Alternately, the first graphic-mounting recess 28 can accommodate various different types of decorative indicia such as etchings, engravings, paintings, logos and the like.

In another embodiment of the present invention, the first cover-fastening mechanism 26 and the second cover-fastening mechanism 27 are integrated into the second contact side 22. Additionally, the first cover-fastening mechanism 26 and the second cover-fastening mechanism 27 are positioned opposite to each other across the second contact side 22. This allows the present invention to be mounted in a manner which places the second contact side 22 coincident to the outer surface of the car cover.

As such, a second graphic-mounting recess 29 allows decorative indicia to be displayed on the encasing structure 2. As is apparent in FIG. 1, the second graphic-mounting recess 29 traverses into the encasing structure 2 from the second contact side 22. Additionally, the second graphic-mounting recess 29 is centrally positioned in between the first cover-fastening mechanism 26 and the second cover-fastening mechanism 27. As a result, the second graphic-mounting recess 29 positions the decorative indicia in a clearly visible area, when the first contact side 21 is used to clamp the car cover.

In the preferred embodiment of the present invention, the encasing structure 2 is made of a soft resin. As is apparent in FIG. 1, the soft resin has a high coefficient of friction which prevents the car cover from sliding away from the encasing structure 2. Additionally, the encasing structure 2 comprises a plurality of rounded corners 30 and a plurality of rounded edges 31. The plurality of rounded corners 30 and the plurality of rounded edges 31 are externally distributed about the encasing structure 2. The plurality of rounded corners 30 prevents the encasing structure 2 form scratching the painted exterior surface of the car if the encasing structure 2 starts sliding on top of the exterior body surface.

Although the invention has been explained in relation to its preferred embodiment, it is to be understood that many other possible modifications and variations can be made without departing from the spirit and scope of the invention as hereinafter claimed.

What is claimed is:

1. A magnetic clamping device for car covers comprises:
   a plurality of magnets;
   an encasing structure;
   a reversible handle;
   a scaffolding;
   the encasing structure comprises a first contact side and a second contact side;
   the first contact side and the second contact side being positioned opposite to each other about the encasing structure;

the plurality of magnets being mounted within the encasing structure by the scaffolding;

the plurality of magnets being distributed throughout the encasing structure;

the plurality of magnets being operatively integrated into the encasing structure, wherein the plurality of magnets generates a stronger magnetic pull across the first contact side and a weaker magnetic pull across the second contact side; and the reversible handle being detachably attached adjacent to the encasing structure.

2. The magnetic clamping device as claimed in claim 1 comprises: the scaffolding comprises a floor panel, and a plurality of slots; each of the plurality of slots traversing towards the floor panel; and the plurality of slots being distributed across the scaffolding; each of the plurality of magnets being mounted into a corresponding slot from the plurality of slots.

3. The magnetic clamping device as claimed in claim 2, wherein the floor panel being an integrated floor panel; and the integrated floor panel being an interior of the second contact side.

4. The magnetic clamping device as claimed in claim 2 comprises: each of the plurality of slots comprises a snap-locking upper lip; the snap-locking upper lip being positioned within an opening of the corresponding slot; and each of the plurality of magnets being pressed and held within the corresponding slot by the snap-locking upper lip, wherein the plurality of magnets is prevented from being pushed out by an integrated floor panel.

5. The magnetic clamping device as claimed in claim 2 comprises: each of the plurality of slots comprises a plurality of snap-locking upper tabs; the plurality of snap-locking tabs being distributed about an opening of the corresponding slot; and each of the plurality of magnets being pressed and held within the corresponding slot by the plurality of snap-locking upper tabs, wherein the plurality of magnets is prevented from being pushed out by an integrated floor panel.

6. The magnetic clamping device as claimed in claim 1 comprises: the reversible handle being positioned across the first contact side.

7. The magnetic clamping device as claimed in claim 1 comprises: the reversible handle being positioned across the second contact side.

8. The magnetic clamping device as claimed in claim 1 comprises: the encasing structure comprises a first handle-attachment bar and a second handle-attachment bar; the first handle-attachment bar being terminally mounted to the encasing structure; the second handle-attachment bar being terminally mounted to the encasing structure, opposite to the first handle-attachment bar; and the first handle-attachment bar and the second handle-attachment bar being positioned in between the first contact side and the second contact side.

9. The magnetic clamping device as claimed in claim 8 comprises: the reversible handle comprises a single continuous strap; the first handle-attachment bar being terminally coupled to the single continuous strap; and the second handle-attachment bar being terminally coupled to the single continuous strap, opposite to the first handle-attachment bar.

10. The magnetic clamping device as claimed in claim 1 comprises: the encasing structure comprises a first cover-fastening mechanism and a second cover-fastening mechanism; the first cover-fastening mechanism and the second cover-fastening mechanism being integrated into the first contact side; and the first cover-fastening mechanism and the second cover-fastening mechanism being positioned opposite to each other across the first contact side.

11. The magnetic clamping device as claimed in claim 10 comprises: a first graphic-mounting recess; the first graphic-mounting recess traversing into the encasing structure from the first contact side; and the first graphic-mounting recess being centrally positioned in between the first cover-fastening mechanism and the second cover-fastening mechanism.

12. The magnetic clamping device as claimed in claim 1 comprises: the encasing structure comprises a first cover-fastening mechanism and a second cover-fastening mechanism; the first cover-fastening mechanism and the second cover-fastening mechanism being integrated into the second contact side; and the first cover-fastening mechanism and the second cover-fastening mechanism being positioned opposite to each other across the second contact side.

13. The magnetic clamping device as claimed in claim 12 comprises: a second graphic-mounting recess; the second graphic-mounting recess traversing into the encasing structure from the second contact side; and the second graphic-mounting recess being centrally positioned in between the first cover-fastening mechanism and the second cover-fastening mechanism.

14. The magnetic clamping device as claimed in claim 1, wherein the encasing structure is made of a resin material.

15. The magnetic clamping device as claimed in claim 1 comprises: the encasing structure comprises a plurality of rounded corners and a plurality of rounded edges; and the plurality of rounded corners and the plurality of rounded edges being externally distributed about the encasing structure.

\* \* \* \* \*